(12) United States Patent
Furumoto

(10) Patent No.: US 12,521,927 B2
(45) Date of Patent: Jan. 13, 2026

(54) OPERATION SCREEN OF MAGNET CLAMP, INJECTION MOLDING MACHINE, AND INJECTION MOLDING MACHINE SYSTEM

(71) Applicant: THE JAPAN STEEL WORKS, LTD., Tokyo (JP)

(72) Inventor: Motomu Furumoto, Tokyo (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 261 days.

(21) Appl. No.: 18/298,017

(22) Filed: Apr. 10, 2023

(65) Prior Publication Data
US 2023/0321885 A1 Oct. 12, 2023

(30) Foreign Application Priority Data

Apr. 11, 2022 (JP) ................................ 2022-064911

(51) Int. Cl.
*B29C 45/76* (2006.01)
*B29C 45/17* (2006.01)
*B29C 45/64* (2006.01)

(52) U.S. Cl.
CPC ...... *B29C 45/7653* (2013.01); *B29C 45/1774* (2013.01); *B29C 45/64* (2013.01); *B29C 2045/645* (2013.01); *B29C 2045/7606* (2013.01); *B29C 2945/7604* (2013.01); *B29C 2945/76157* (2013.01); *B29C 2945/76224* (2013.01); *B29C 2945/76869* (2013.01)

(58) Field of Classification Search
CPC . B29C 45/7653; B29C 45/1774; B29C 45/64; B29C 2045/645; B29C 2045/7606; B29C 2945/7604; B29C 2945/76157; B29C 2945/76224; B29C 2945/76869; B29C 45/76; B29C 45/1756
See application file for complete search history.

(56) References Cited

U.S. PATENT DOCUMENTS

| | | | | |
|---|---|---|---|---|
| 6,089,849 A | * | 7/2000 | Bulgrin | B29C 45/82 |
| | | | | 425/149 |
| 6,171,092 B1 | * | 1/2001 | Galt | B29C 45/80 |
| | | | | 264/40.5 |
| 6,636,153 B1 | | 10/2003 | Barton et al. | |
| 11,285,648 B2 | * | 3/2022 | Girault | B29C 33/30 |
| 11,642,824 B2 | * | 5/2023 | Halter | G01B 7/18 |
| | | | | 700/200 |
| 2005/0244537 A1 | * | 11/2005 | Uchiyama | B29C 45/1751 |
| | | | | 425/593 |

(Continued)

FOREIGN PATENT DOCUMENTS

| | | |
|---|---|---|
| EP | 3 888 871 A1 | 10/2021 |
| JP | 2005-515080 A | 5/2005 |

(Continued)

OTHER PUBLICATIONS

Communication dated Oct. 17, 2025, issued by the Japanese Patent Office in Japanese Application No. 2022-064911.

*Primary Examiner* — Nahida Sultana
(74) *Attorney, Agent, or Firm* — Sughrue Mion, PLLC

(57) ABSTRACT

An operation screen of a magnet clamp is displayed on a controller of an injection molding machine. A mold clamping device of the injection molding machine is provided with the magnet clamp. The operation screen is for controlling the magnet clamp to perform clamping or unclamping of a mold.

10 Claims, 11 Drawing Sheets

(56) References Cited

U.S. PATENT DOCUMENTS

| | | | |
|---|---|---|---|
| 2010/0092587 A1 | 4/2010 | Kimura | |
| 2013/0022698 A1* | 1/2013 | Kasuga | B29C 45/80 |
| | | | 425/149 |
| 2015/0202815 A1* | 7/2015 | Murata | B29C 45/76 |
| | | | 425/149 |
| 2015/0298376 A1 | 10/2015 | Tozawa | |
| 2017/0113390 A1* | 4/2017 | Asaoka | B29C 45/80 |
| 2021/0046673 A1* | 2/2021 | Akamatsu | B29C 45/84 |
| 2021/0362389 A1* | 11/2021 | Yoshida | B29C 33/305 |
| 2022/0227025 A1 | 7/2022 | Akamatsu | |
| 2022/0250299 A1* | 8/2022 | Okamoto | B29C 45/80 |
| 2025/0326171 A1* | 10/2025 | Furumoto | B29C 45/7653 |

FOREIGN PATENT DOCUMENTS

| | | |
|---|---|---|
| JP | 2010-234721 A | 10/2010 |
| JP | 2015-205395 A | 11/2015 |
| JP | 2019-72933 A | 5/2019 |
| JP | 2021-160275 A | 10/2021 |
| WO | 2008/105033 A1 | 9/2008 |
| WO | 2020/241090 A1 | 12/2020 |

* cited by examiner

FIG. 3B-2

MOVABLE SIDE

| CLAMP STATE | |
|---|---|
| CLAMP COMPLETED | ○ |
| RELEASE COMPLETED | ○ |
| CLAMPING | ○ |
| RELEASING | ○ |
| MOLD DETECTION | ○ |
| MOLD ABNORMALITY BYPASSING | ○ |

| ERROR STATE | |
|---|---|
| CURRENT ABNORMALITY (UCS UPPER LIMIT) | ○ |
| CURRENT ABNORMALITY (UCS LOWER LIMIT) | ○ |
| DRIVE PULSE ABNORMALITY | ○ |
| OVERCURRENT ABNORMALITY | ○ |
| CONTROL CURRENT ABNORMALITY | ○ |
| MOLD ABNORMALITY | ○ |
| MAGNETIZATION FORCE ABNORMALITY | ○ |
| MOLD PEELING ABNORMALITY | ○ |

| ERROR STATE | |
|---|---|
| TEMPERATURE SENSOR ABNORMALITY | ○ |
| TEMPERATURE ABNORMALITY | ○ |
| INTERNAL SW ABNORMALITY | ○ |
| INTERNAL MEMORY ABNORMALITY | ○ |
| OPERATION UNCOMPLETION ABNORMALITY | ○ |
| PROTECT ABNORMALITY | ○ |
| CLAMPER IN USE | ○ |

MAGNETIZATION FORCE    83kN
TEMPERATURE           84.8°C

FIG. 7A

| INTERLOCK | | |
|---|---|---|
| CLAMPER OPERATION | | ○ |
| SERVO ACTIVATION | | ○ |
| CLOSE SAFETY DOOR | | ○ |
| PREPARATION MODE | | ○ |
| CLAMPER OPERATION MODE | | ○ |

| | UPPER SIDE RELEASE | | | UPPER SIDE CLAMP | |
|---|---|---|---|---|---|
| | MOLD TOUCH | ○ | | MOLD TOUCH | ○ |

| | LOWER SIDE RELEASE | | | LOWER SIDE CLAMP | |
|---|---|---|---|---|---|
| | EJ RELEASE LIMIT | ○ | | EJ RELEASE LIMIT | ○ |

| MONITOR | | |
|---|---|---|
| MOLDING MACHINE MONITOR | | ○ |
| AUTOMATIC INTERLOCK | | ○ |
| MOLD CLOSED INTERLOCK | | ○ |
| MOLD OPEN INTERLOCK | | ○ |
| TB INTERLOCK | | ○ |
| CLAMPER NORMALITY | | ○ |

| | UPPER MOLD | PULL | SET |
|---|---|---|---|
| | CLAMPER | | ○ |
| | CLAMPER PRESSURE | | ○ |

| | LOWER MOLD | PULL | SET |
|---|---|---|---|
| | CLAMPER A | | ○ |
| | CLAMPER A PRESSURE | ○ | |
| | CLAMPER B | | ○ |
| | CLAMPER B PRESSURE | ○ | |

MOLD PLATEN POSITION  0.0mm  
CROSS HEAD POSITION  0.00mm  
IU POSITION  0.00mm  
EJ POSITION  0.00mm

OPERATION SCREEN OF MAGNET CLAMP, INJECTION MOLDING MACHINE, AND INJECTION MOLDING MACHINE SYSTEM

CROSS-REFERENCE TO RELATED APPLICATIONS

This application is based on and claims priority under 35 USC 119 from Japanese Patent Application No. 2022-064911 filed on Apr. 11, 2022, the entire content of which is incorporated herein by reference.

TECHNICAL FIELD

The present disclosure relates to an operation screen displayed on a controller of an injection molding machine provided with a magnet clamp, an injection molding machine provided with the magnet clamp, and an injection molding machine system.

BACKGROUND

A magnet clamp is provided on a fixed platen and a movable platen of a mold clamping device, for example, as described in JP2019-072933A. The magnet clamp includes a magnet clamp plate with which a mold is in contact, and a plurality of magnet cores each including a permanent magnet, a permanent electromagnet, and a coil are embedded in the magnet clamp plate. When electric power is supplied to the coil, magnetic poles of the permanent electromagnet are reversed, and magnetic forces of the permanent magnet and the permanent electromagnet offset each other. Accordingly, magnetic lines of force cannot be emitted from a surface of the magnet clamp plate. Since the mold does not receive a magnetization force from the magnet clamp plate, the mold can move freely. On the other hand, when the supply of the electric power to the coil is stopped, a direction of the magnetic force of the permanent magnet coincides with a direction of the magnetic force of the permanent electromagnet, the magnetic forces are strengthened, and magnetic lines of force are emitted from the surface of the magnet clamp plate. Accordingly, the mold can be clamped with a strong magnetization force.

SUMMARY

The magnet clamp unclamps the mold by supplying the electric power to the coil, and clamps the mold by stopping the supply of electric power, and is excellent in that clamping or unclamping can be easily performed. However, operation of the magnet clamp is performed by a dedicated controller, and the operation of the magnet clamp cannot be performed by an injection molding machine. In this case, an operator is required to stop the injection molding machine, confirm that safety has been ensured, and then operate the dedicated controller to operate the magnet clamp. This is because it is dangerous if the injection molding machine operates erroneously during the operation of the magnet clamp. Similarly, when the operator controls the injection molding machine, it is necessary to confirm in advance that the operation of the magnet clamp has been completed. As described above, there is a problem that the operator needs to alternately operate a controller of the injection molding machine and the dedicated controller of the magnet clamp in consideration of safety, which is complicated.

Therefore, illustrative aspect of the present disclosure provide a magnet clamp operation screen, an injection molding machine, and an injection molding machine system which improve operability.

Other problems and novel features will become apparent from the description of the present specification and the accompanying drawings.

The present disclosure is directed to a screen displayed on a controller of an injection molding machine. A mold clamping device of the injection molding machine of a target is provided with a magnet clamp. The controller of the injection molding machine is provided with an operation screen of the magnet clamp for controlling the magnet clamp to clamp or unclamp a mold.

According to the present disclosure, the magnet clamp can be operated on the controller that controls the injection molding machine, and the operation becomes easy.

BRIEF DESCRIPTION OF DRAWINGS

FIGS. 3A-1 and 3A-2 depict one example of an operation screen of a magnet clamp according to the illustrative embodiment.

FIGS. 3B-1 and 3B-2 depict another example of the operation screen of the magnet clamp according to the illustrative embodiment.

FIGS. 7A and 7B depict an operation screen of the magnet clamp according to the illustrative embodiment provided in the vertical injection molding machine.

DETAILED DESCRIPTION

Figure 1:
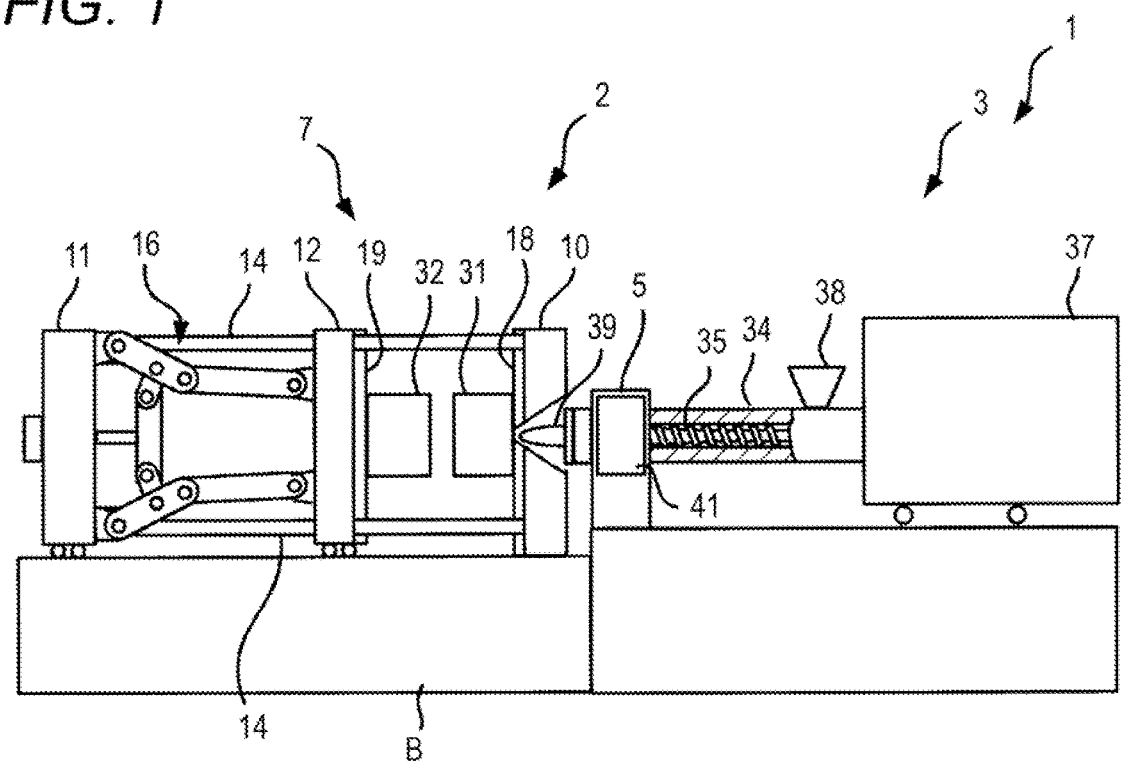
FIG. 1 is a front view showing an injection molding machine according to an illustrative embodiment.

Hereinafter, illustrative embodiments will be described in detail with reference to the drawings. However, the present invention is not limited to the following illustrative embodiments. In order to clarify the description, the following description and the drawings are simplified as appropriate. In the drawings, the same elements are denoted by the same reference numerals, and repeated description thereof is omitted as necessary. In addition, hatching may be omitted to avoid complicating the drawings.

The present illustrative embodiment will be described.
{Injection Molding Machine}

As shown in FIG. 1, an injection molding machine 1 according to the present illustrative embodiment includes a mold clamping device 2 provided on a bed B, an injection device 3 provided on the bed B, and a controller 5 configured to control the mold clamping device 2 and the injection device 3.

{Mold Clamping Device}

The mold clamping device 2 includes a fixed platen 10 fixed to the bed B, a mold clamping housing 11 slidably provided on the bed B, and a movable platen 12 slidably provided on the bed B between the fixed platen 10 and the mold clamping housing 11. The fixed platen 10 and the mold clamping housing 11 are connected by a plurality of, for example, four tie bars 14. The movable platen 12 passes through the tie bars 14. A mold clamping mechanism is provided between the mold clamping housing 11 and the movable platen 12. In the present illustrative embodiment, the clamping mechanism is a toggle mechanism 16. Therefore, when the toggle mechanism 16 is driven, the movable platen 12 is driven in an approaching direction to and a separating direction from the fixed platen 10. The mold clamping device 2 according to the present illustrative embodiment is provided with a magnet clamp 7 to be described below.

{Magnet Clamp}

In the present illustrative embodiment, the magnet clamp 7 includes a fixed side magnet clamp 18 and a movable side magnet clamp 19. The fixed side magnet clamp 18 is provided on the fixed platen 10. The movable side magnet clamp 19 is provided on the movable platen 12. The fixed side magnet clamp 18 and the movable side magnet clamp 19 are configured in the same manner, so that only the fixed side magnet clamp 18 will be described with reference to FIG. 2.

The fixed side magnet clamp 18 includes a magnet clamp plate 21 having the similar size as the fixed platen 10. A plurality of bolt holes 23, 23, . . . are formed in the magnet clamp plate 21, and the magnet clamp plate 21 is fixed to the fixed platen 10 by bolts. A hollowed-out hole 22 is formed in a center of the magnet clamp plate 21. An injection nozzle 39 of the injection device 3 (see FIG. 1), which will be described later, is inserted into the hollowed-out hole 22.

A plurality of bottomed holes are formed on a back surface side of the magnet clamp plate 21. That is, core holes 25, 25, . . . are formed on a surface, which is to be in contact with the fixed platen 10, of the magnet clamp plate 21. Although not shown in the drawings, magnet cores, each including a permanent magnet, a permanent electromagnet, and a coil, are inserted into the core holes 25, respectively. A power supply unit 27 is provided on the rear surface side of the magnet clamp plate 21. A power supply wiring 28 extends from the power supply unit 27. A plurality of branch wirings 29, 29, . . . , are branched from the power supply wiring 28 and connected to the magnet cores inserted in the core holes 25, 25, . . . , respectively.

When a short time current is supplied from the power supply unit 27, the coil of the magnet core is energized, and magnetic poles of the permanent electromagnet are reversed. Then, magnetic lines of force of the permanent magnet and the permanent electromagnet offset each other out in the magnet core, and the magnetic lines of force are not emitted from a surface of the magnet clamp plate 21. Since no magnetization force is generated, a mold can be unclamped. On the other hand, when electric power supply from the power supply unit 27 is stopped, the magnetic poles of the permanent electromagnet return to an original state. The magnetic lines of force of the permanent magnet and the permanent electromagnetic magnet are combined and strengthened in the magnet core, and the magnetic lines of force are emitted from the surface of the magnet clamp plate 21. A strong magnetization force acts on the mold to clamp the mold.

The magnet clamp plate 21 is provided with a temperature sensor 30 configured to measure the temperature of the magnet clamp plate 21. Further, the magnet clamp plate 21 is provided with magnetic field detection sensors configured to detect an intensity of a magnetic field formed by magnetic lines of force emitted from the surface of the magnet clamp plate 21. Although not shown, the magnetic field detection sensors are provided in the core holes 25, 25, . . . , respectively, and are configured to detect the intensity of the magnetic field from the magnet cores, respectively. The temperature detected by the temperature sensor 30 and the intensity of the magnetic field detected by the magnetic field detection sensors are sent to the controller 5 (see FIG. 1). The controller 5 is configured to calculate the magnetization force at the time of clamping the mold based on the intensity of the magnetic field.

In the magnet clamp 7 configured as described above, as shown in FIG. 1, a fixed side mold 31 is clamped to the fixed side magnet clamp 18, and a movable side mold 32 is clamped to the movable side magnet clamp 19.

{Injection Device}

The injection device 3 includes a heating cylinder 34, a screw 35 provided in the heating cylinder 34, and a screw drive device 37 configured to drive the screw 35. A hopper 38 is provided in a rear side of the heating cylinder 34. An injection material is put into the hopper 38. The injection nozzle 39 is provided in front of the heating cylinder 34.

{Controller}

In the present illustrative embodiment, the controller 5 is configured to control not only the mold clamping device 2 and the injection device 3 but also the magnet clamp 7. That is, the controller 5 is configured to integrally control the injection molding machine 1 including the magnet clamp 7. The controller 5 is provided with a monitor 41, and various screens such as a magnet clamp operation screen described below are displayed thereon. In the present illustrative embodiment, the monitor 41 is a touch panel, and allowing a selection of an icon such as a button or a tab displayed on a screen. The monitor 41 is configured to receive a user's operation via the touch panel.

{Magnet Clamp Operation Screen}

Figure 2:
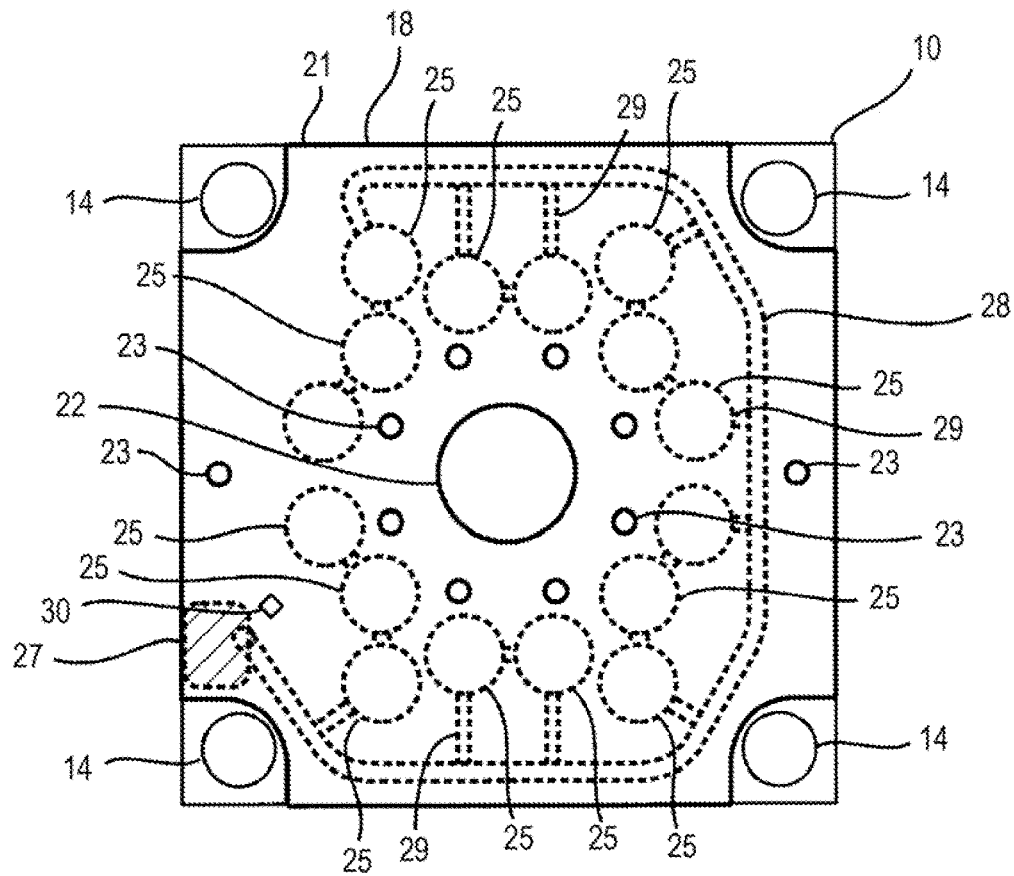
FIG. 2 is a front view showing a part of a mold clamping device and a fixed side magnet clamp according to the illustrative embodiment.
Figures 1, 3A:
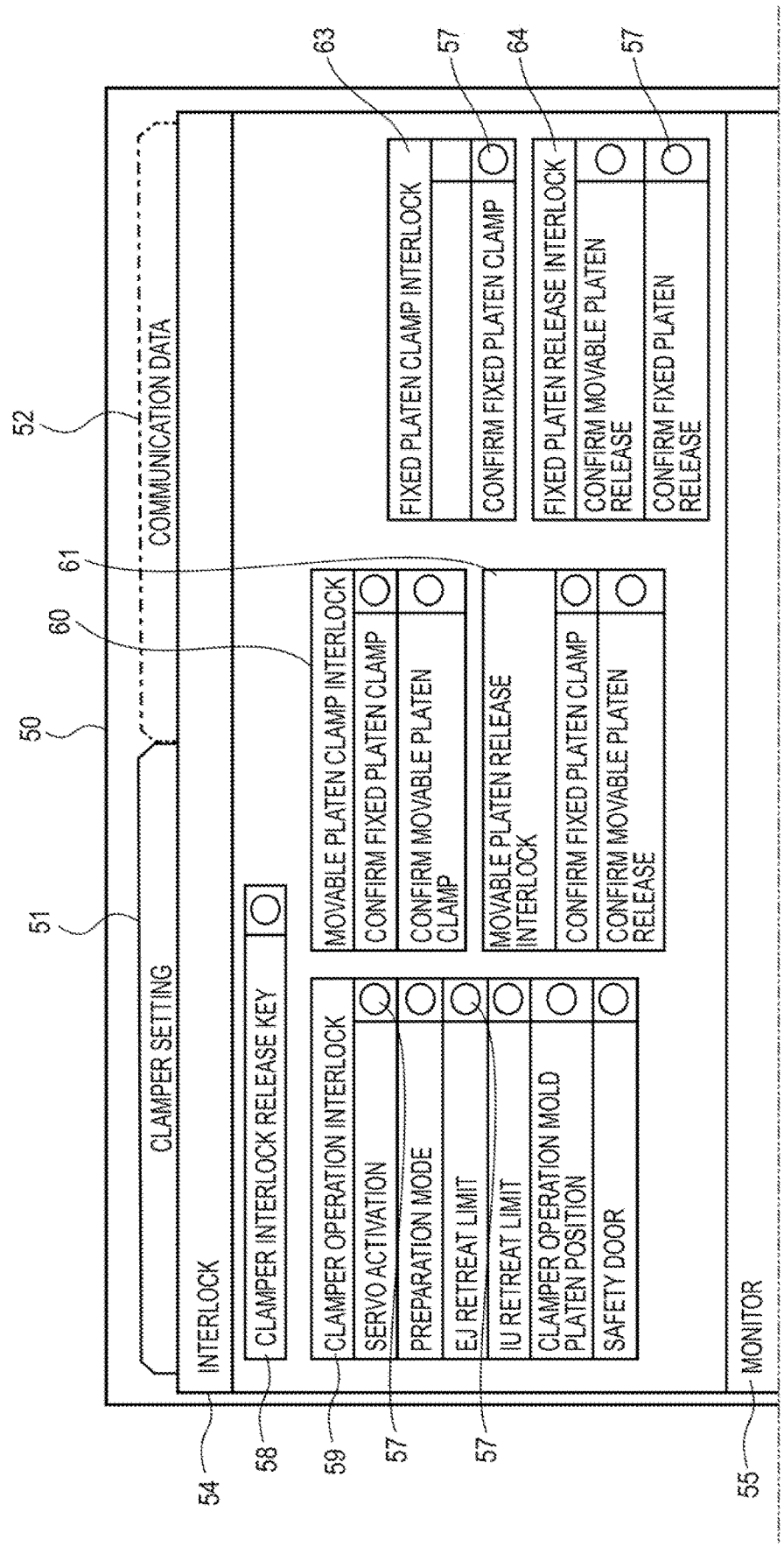
Figures 2, 3A:
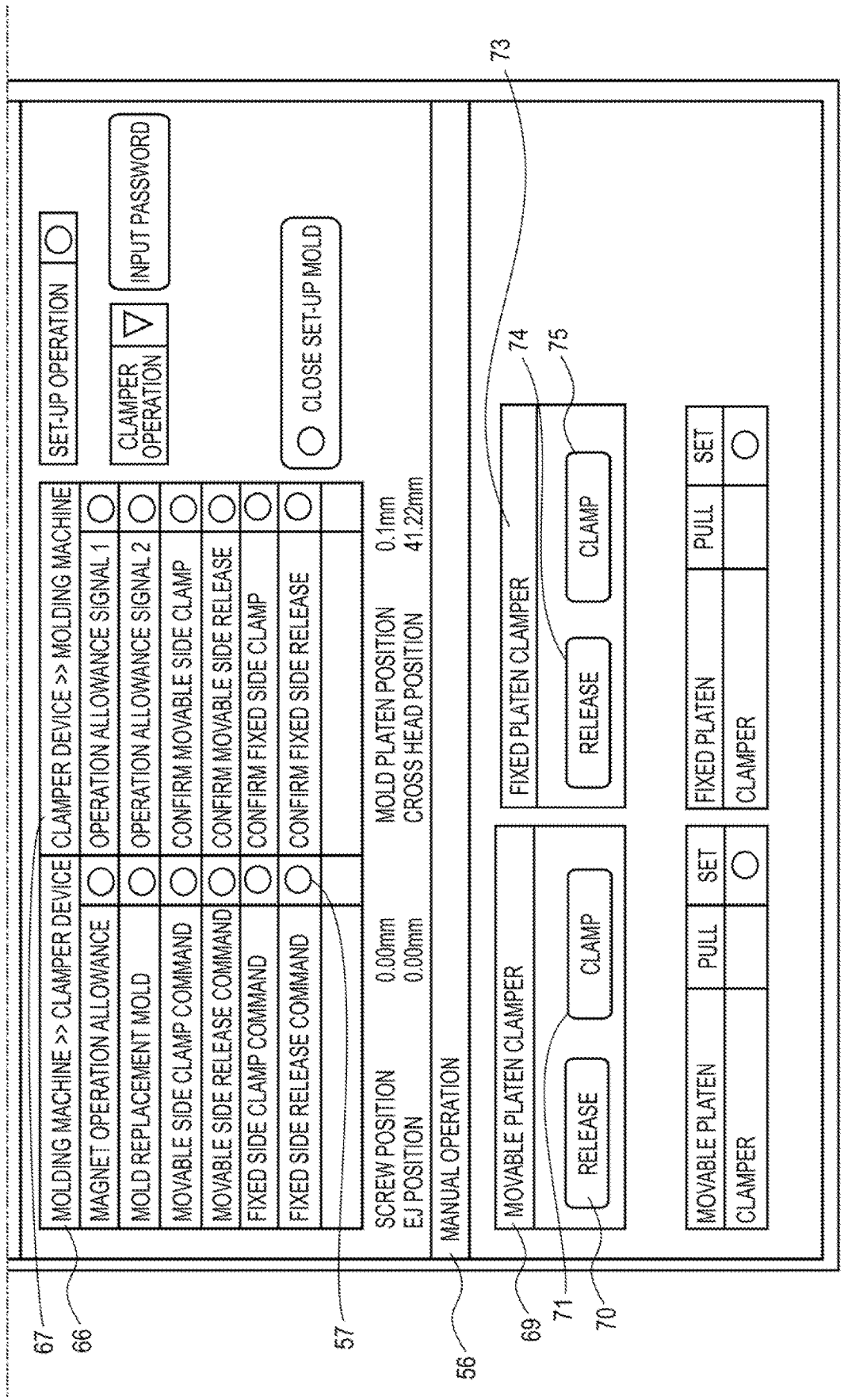
Figures 1, 3B:
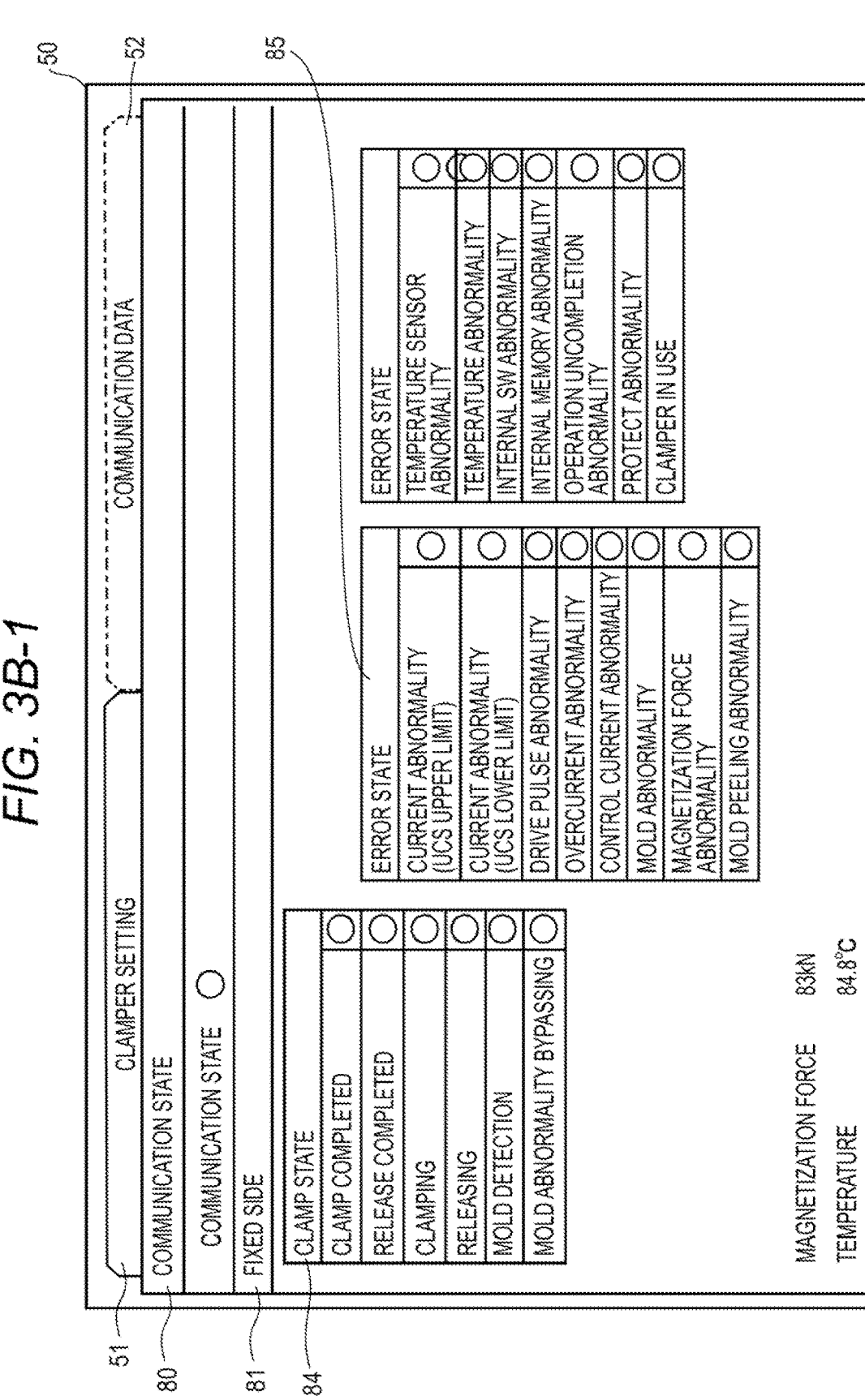

A magnet clamp operation screen 50 according to the present illustrative embodiment is configured as shown in FIGS. 3A-1 and 3A-2. First, the screen is provided with a damper setting display tab 51 and a communication data display tab 52 for switching between a "damper setting" display for operating the magnet clamp 7 (see FIG. 1) and a "communication data" display for displaying a state such as normality and abnormality of the magnet clamp 7. FIGS. 3A-1 and 3A-2 show a state in which the damper setting display tab 51 is selected and the display is switched to the "damper setting" display. In contrast, when the communication data display tab 52 is selected, the display is switched to the "communication data" display as shown in FIGS. 3B-1 and 3B-2.

When "damper setting" is displayed, as shown in FIGS. 3A-1 and 3A-2, the magnet clamp operation screen 50 includes three columns. That is, an upper part is an interlock column 54, a middle part is a monitor column 55, and a lower part is a manual operation column 56.

The injection molding machine 1 according to the present illustrative embodiment is provided with an interlock to prevent the magnet clamp 7 from being operated during operation of the injection molding machine 1 and to prevent the injection molding machine 1 from being operated during operation of the magnet clamp 7, mutually. In the interlock column 54, a mutual interlock state between the magnet clamp 7 and the injection molding machine 1 is displayed.

A clamper interlock release key column 58 displays whether the interlock for the operation of the magnet clamp 7 is released. In a clamper operation interlock column 59, an operation state of the injection molding machine 1, for example, whether a servo is activated, whether an ejector is retreated, and the like are displayed by colors of indicator icons 57, 57, . . . , provided on the right of respective items. If at least one of them is in the operating state, the magnet clamp 7 is interlocked and cannot be operated.

Information of interlock for clamping and unclamping operation in the movable side magnet clamp 19 (see FIG. 1) is displayed in a movable platen clamp interlock column 60 and a movable platen release interlock column 61, respectively. Similarly, information of interlock for clamping and unclamping operation in the fixed side magnet clamp 18 (see FIGS. 1 and 2) is displayed in a fixed platen clamp interlock column 63 and a fixed platen release interlock column 64, respectively.

The monitor column 55 displays contents of signals communicated between the controller 5 (see FIG. 1) of the injection molding machine 1 and the magnet clamp 7 when the clamp or unclamp operation is performed in the magnet clamp 7. In a molding machine>>clamper device column 66, information on a signal transmitted from the controller 5 to a magnet clamp 7 side is displayed. In a damper device>>molding machine column 67, information on a signal transmitted from the magnet clamp 7 to the controller 5 is displayed. In the monitor column 55, information such as a screw position and a mold clamping position is also displayed.

The manual operation column 56 is a column for operating the magnet clamp 7. A movable platen damper column 69 is a column for operating the movable side magnet clamp 19 (see FIG. 1). The movable platen clamper column 69 includes a release button 70 to be selected for unclamping the mold 32 and a clamp button 71 to be selected for clamping the mold 32. A fixed platen damper column 73 is a column for operating the fixed side magnet clamp 18 (see FIGS. 1 and 2). The fixed platen damper column 73 includes a release button 74 to be selected for unclamping the mold 31 and a clamp button 75 to be selected for clamping the mold 31.

When the communication data display tab 52 is selected on the magnet clamp operation screen 50, the display is switched to the "communication data" display as shown in FIGS. 3B-1 and 3B-2. At this time, the magnet clamp operation screen 50 includes three columns. That is, an upper stage is a communication state column 80, a middle stage is a fixed side column 81, and a lower stage is a movable side column 82. The communication state column 80 displays a communication state between the controller 5 and the magnet clamp 7. In the fixed side column 81, a clamp state column 84 and an error state column 85 are displayed. The clamp state column 84 displays a clamp state of the fixed side magnet clamp 18 (see FIGS. 1 and 2). The error state column 85 indicates an occurrence situation of an error. In the fixed side column 81, a magnetization force and a temperature of the fixed side magnet clamp 18 are displayed.

In the movable side column 82, a clamp state column 87 and an error state column 88 are displayed. The clamp state column 87 displays a clamp state of the movable side magnet clamp 19 (see FIG. 1). The error state column 88 indicates an occurrence situation of an error. The movable side column 82 also displays a magnetization force and a temperature of the movable side magnet clamp 19.

In the magnet clamp 7 (see FIG. 1), management of the temperatures and the magnetization forces is important. This is because the magnetic force of the permanent magnet used in the magnet clamp 7 decreases depending on the temperature. When the magnetization force decreases, a problem may occur in clamping of the molds 31, 32. Therefore, as described above, the respective temperatures and the magnetization forces are displayed in the fixed side column 81 and the movable side column 82.

Figure 4A:
FIG. 4A depicts one example of a pop-up screen of an operation screen of the magnet clamp according to the illustrative embodiment.
Figure 4B:
FIG. 4B depicts another example of a pop-up screen of the operation screen of the magnet clamp according to the illustrative embodiment.

Various types of errors, that is, error types, are displayed in the respective error state columns 85, 88 of the fixed side column 81 and the movable side column 82. When an error occurs and an item indicating an error type is selected, pop-up windows 90, 91 as shown in FIGS. 4A and 4B are displayed. In the pop-up windows 90, 91, a content of the error type and a method for handling the error type performed by the operator are displayed.

An error may occur in the magnet clamp 7 (see FIG. 1) during the operation of the injection molding machine 1. At this time, even if another screen is displayed on the monitor 41, screens as shown in FIGS. 4A and 4B, that is, the pop-up windows 90, 91 indicating the contents of the error types and the handling methods are displayed.

{Injection Molding Machine System}

Figure 5A:
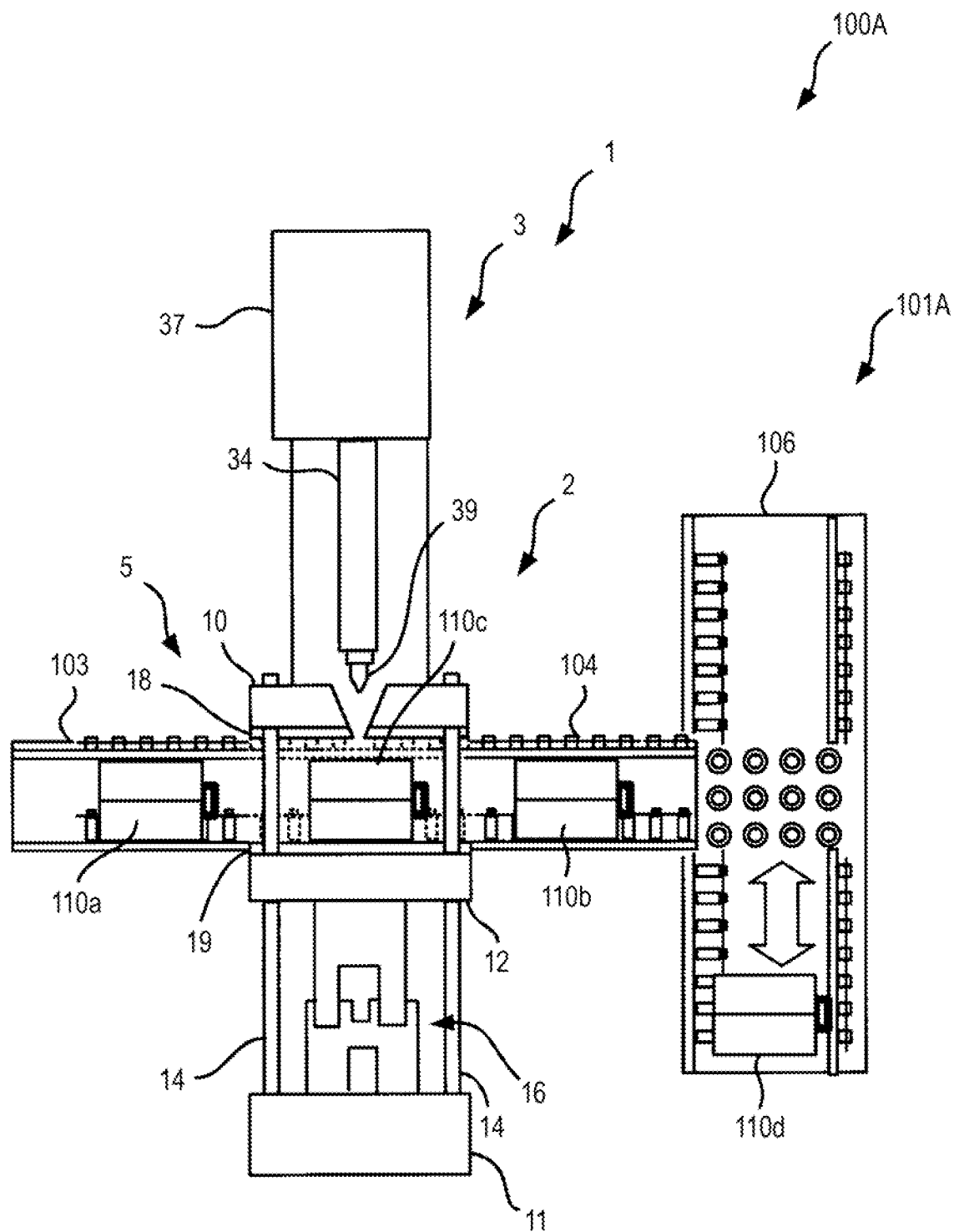
FIG. 5A is a top view showing an injection molding machine system according to a first illustrative embodiment.

FIG. 5A shows an injection molding machine system 100A according to a first illustrative embodiment including the injection molding machine 1 according to the present illustrative embodiment. The injection molding machine system 100A includes the injection molding machine 1 and a mold replacement device system 101A. In the first illustrative embodiment, the mold replacement device system 101A includes first and second mold replacement devices 103, 104, and a mold conveyance device 106. The first and second mold replacement devices 103, 104 are provided on left and right sides of the mold clamping device 2. The mold conveyance device 106 is connected to the second mold replacement device 104.

The first and second mold replacement devices 103, 104 are configured to convey molds 110a, 110b, and so on to the mold clamping device 2 of the injection molding machine 1 or are configured to convey a mold 110c out of the mold clamping device 2. The mold conveyance device 106 is configured to convey a mold 110d and so on. For example, the mold conveyance device 106 is configured to convey the mold 110b from the second mold replacement device 104 to an external automatic mold warehouse (not shown) or the like, and is configured to move the mold 110d placed on the mold conveyance device 106 to the second mold replacement device 104. As described above, the mold replacement device system 101A includes the first and second mold replacement devices 103, 104 and the mold conveyance device 106. Accordingly, a relatively large number of molds 101a, 101b, and so on can be handled and replaced.

In the injection molding machine system 100A, the magnet clamp 7 provided in the injection molding machine 1 is automatically controlled by the controller 5 (not shown). Therefore, the molds 110a, 110b, and so on are automatically clamped or unclamped when the molds 110a, 110b, and so on are replaced.

Figure 5B:
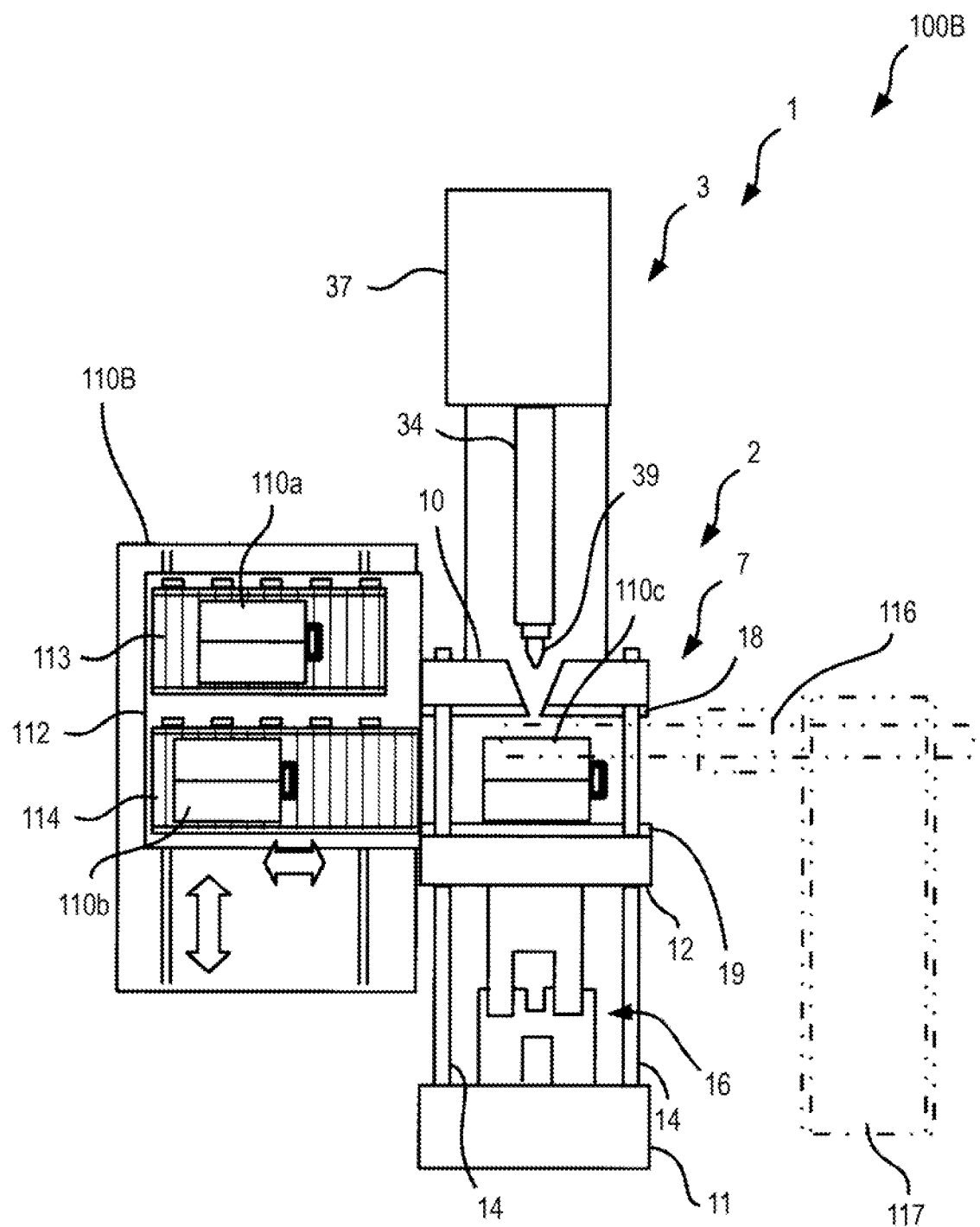
FIG. 5B is a top view showing an injection molding machine system according to a second illustrative embodiment.

FIG. 5B shows an injection molding machine system 100B according to a second illustrative embodiment. A mold replacement device system 101B provided in the injection molding machine system 100B includes a movable table 112 and first and second mold replacement devices 113, 114. The movable table 112 is slidable in a horizontal direction. The first and second mold replacement devices 113, 114 are placed on the movable table 112. Therefore, similarly to the injection molding machine system 100A according to the first illustrative embodiment, the molds 110a, 110b, and so on can be automatically replaced. Incidentally, FIG. 5B also shows a molded product conveyance device 116 for conveying a molded product, and a conveyor belt for conveyance 117.

{Vertical Injection Molding Machine}

The present illustrative embodiment may be variously modified. For example, although the injection molding machine 1 has been explained as a horizontal type, the injection molding machine 1 can also be implemented by a vertical injection molding machine 121 shown in FIG. 6. The vertical injection molding machine 121 includes a mold clamping device 122, an injection device 123 and a controller 125. The injection device is provided on the mold clamping device 122. The controller 125 is configured to control the mold clamping device 122 and the injection device 123.

{Mold Clamping Device}

The mold clamping device 122 includes a fixed platen 129 fixed to the bed 127, an upper movable platen 130 provided above the fixed platen 129, and a lower movable platen (not shown) provided in the bed 127. In the present illustrative embodiment, the upper movable platen 130 and the lower movable platen are connected by three tie bars 132, 132, . . . . The upper movable platen 130 is driven up and down when a mold clamping mechanism (not shown) provided between the lower movable platen and the fixed platen 129 is driven. In the mold clamping device 122 according to the present illustrative embodiment, a turntable 134 is provided on the fixed platen 129. The turntable 134 rotates by 180 degrees, that is, is reversed around one tie bar 132 in the center.

{Magnet Clamp}

Figure 6:
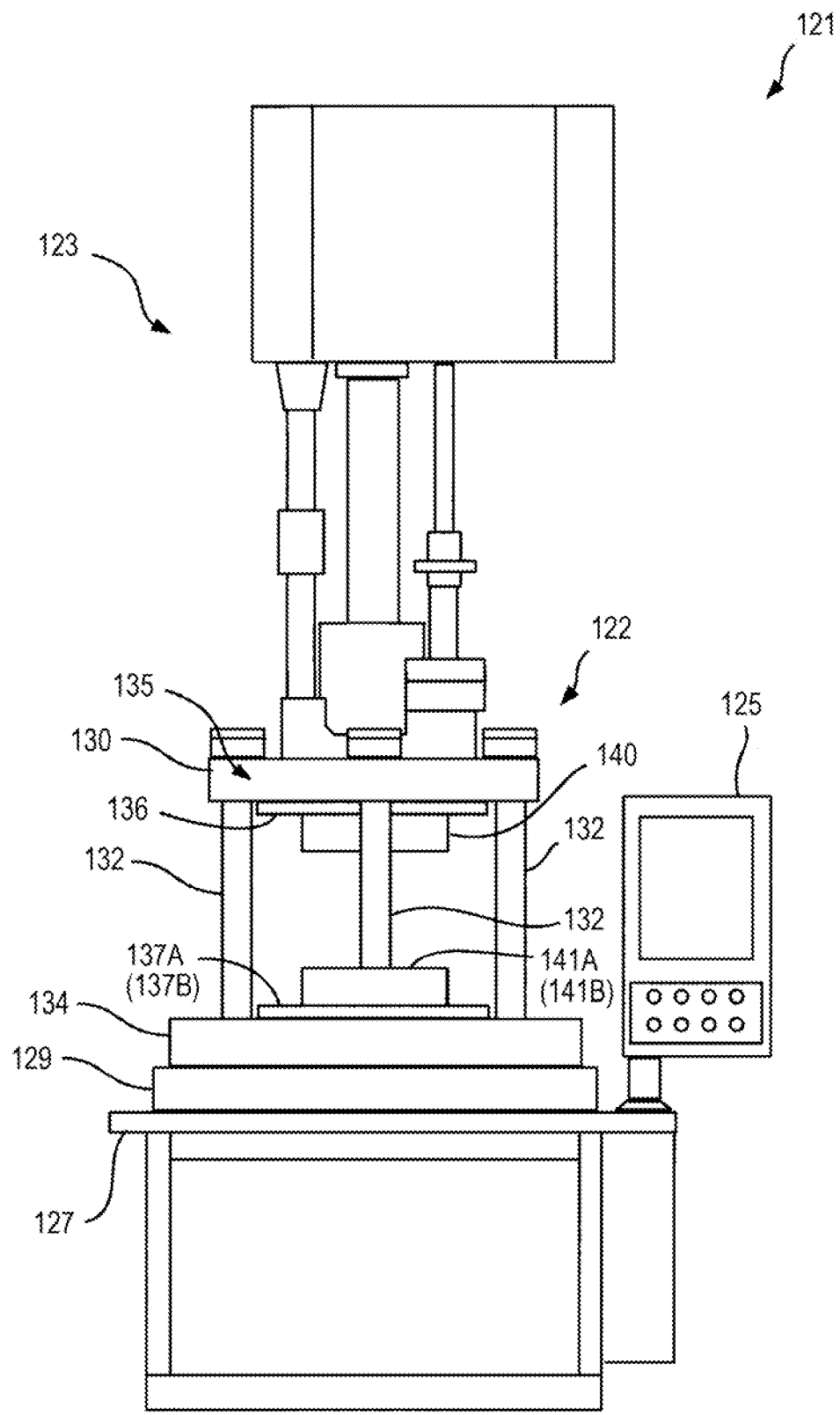
FIG. 6 is a front view showing a vertical injection molding machine according to the illustrative embodiment.

The mold clamping device 122 is provided with a magnet clamp 135. That is, provided are an upper magnet clamp 136 provided on the upper movable platen 130 and lower magnet clamps 137A, 137B provided on the turntable 134. In FIG. 6, the lower magnet clamp 137B overlaps the front lower magnet clamp 137A and is hidden. When the turntable 134 is reversed, the lower magnet clamp 137B comes to the front. An upper mold 140 is clamped to the upper magnet clamp 136. A lower mold 141A and a lower mold 141B are clamped to the lower magnet clamps 137A, 137B, respectively.

{Injection Device}

The injection device 123 is provided on the upper movable platen 130 of the mold clamping device 122, but description thereof will be omitted.

{Magnet Clamp Operation Screen}

Figure 7B:
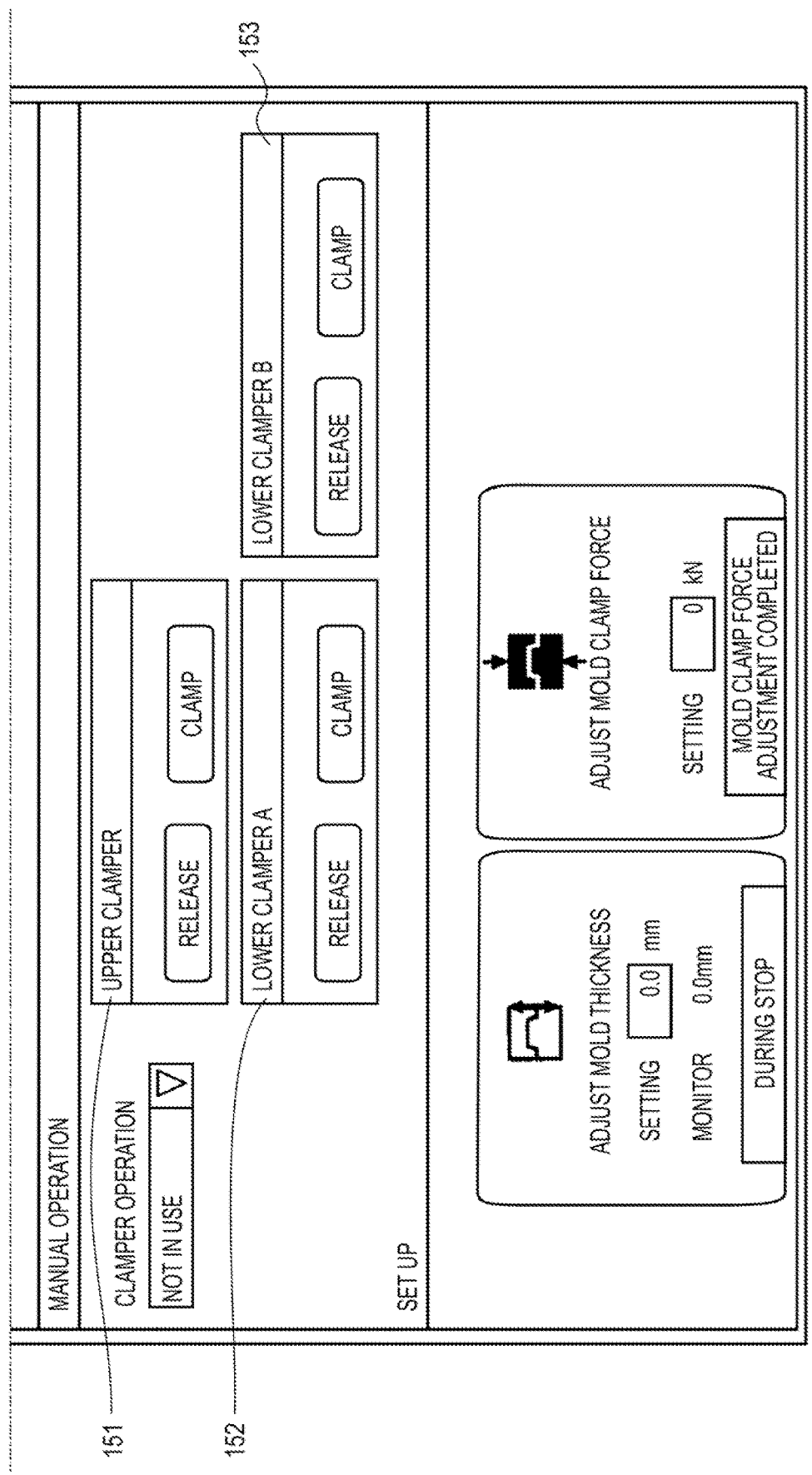

FIGS. 7A and 7B show a magnet clamp operation screen 150 displayed on the controller 125 of the vertical injection molding machine 121 according to the present illustrative embodiment. Since a configuration thereof is substantially the same as that of the magnet clamp operation screen 50 (see FIGS. 3A-1 to 3B-2) displayed on the controller 5 of the horizontal injection molding machine 1 (see FIG. 1), a detailed description thereof will be omitted, and only some different points will be complementarily described. That is, in the vertical injection molding machine 121, the magnet clamp 135 includes an upper magnet clamp 136 and lower magnet clamps 137A, 137B, as described above. These are displayed as "upper clamper", "lower damper A", and "lower damper B", respectively, as indicated by reference numerals 151, 152, and 153. The magnet clamp operation screen 150 according to this illustrative embodiment is also configured such that the molds 140, 141A, and 141B (see FIG. 6) can be safely clamped and unclamped.

Although the invention made by the present inventor is specifically described based on the illustrative embodiments, it is needless to say that the present invention is not limited to the illustrative embodiments described above, and various modifications can be made without departing from the scope of the invention. A plurality of examples described above can be implemented in combination as appropriate.

What is claimed is:

1. An operation screen of a magnet clamp displayed on a controller of an injection molding machine,
    wherein a mold clamping device of the injection molding machine is provided with the magnet clamp,
    wherein the operation screen is for controlling the magnet clamp to perform clamping or unclamping of a mold, and
    wherein the controller is configured to control the operation screen to display first information regarding a fixed side magnet clamp of the magnet clamp, second information regarding a movable side magnet clamp of the magnet clamp, and third information regarding a communication state between the controller and the magnet clamp;
    wherein the first information comprises:
        a clamp state of the fixed side magnet clamp of the magnet clamp, the fixed side magnet clamp being provided on a fixed platen of the mold clamping device;
        an error state of the fixed side magnet clamp in a case where an error occurs in the fixed side magnet clamp; and
    wherein the second information comprises:
        a clamp state of the movable side magnet clamp of the magnet clamp, the movable side magnet clamp being provided on a movable platen of the mold clamping device;
        an error state of the movable side magnet clamp in a case where an error occurs in the movable side magnet clamp.

2. The operation screen of a magnet clamp according to claim 1,
    wherein the magnet clamp and the injection molding machine are provided with an interlock, the interlock being configured to:
        restrict control of the injection molding machine during operation of the magnet clamp; and
        restrict the operation of the magnet clamp during the control of the injection molding machine, and
    wherein the operation screen displays an item related to the interlock.

3. The operation screen of a magnet clamp according to claim 1, wherein the operation screen displays a temperature of the magnet clamp.

4. The operation screen of a magnet clamp according to claim 1, wherein the operation screen displays a magnetization force of the magnet clamp.

5. The operation screen of a magnet clamp according to claim 1, wherein in a case where an error occurs in the magnet clamp, the operation screen displays an error type, the error type being a type of the error.

6. The operation screen of a magnet clamp according to claim 5, wherein the operation screen displays a description of the error type and a method for handling the error type.

7. The operation screen of a magnet clamp according to claim 1, wherein the magnet clamp and the injection molding machine are provided with an interlock, the interlock being configured to:
    restrict control of the injection molding machine during operation of the magnet clamp; and
    restrict the operation of the magnet clamp during the control of the injection molding machine, and
wherein the controller is configured to control the operation screen to display:
    a mutual interlock state between the magnet clamp and the injection molding machine;
    a signal information including content of signal communicated between the controller of the injection molding machine and the magnet clamp in a case the magnet clamp performs the clamping or unclamping; and
    a manual operation icon for operating the magnet clamp.

8. The operation screen of a magnet clamp according to claim 1, wherein the first information comprises:
    a magnetization force of the fixed side magnet clamp; and
    a temperature of the fixed side magnet clamp, and
    wherein the second information comprises:
    a magnetization force of the movable side magnet clamp; and
    a temperature of the movable side magnet clamp.

9. The operation screen of a magnet clamp according to claim 8, wherein based on receiving a selection of the error state of the fixed side magnet clamp or the error state of the movable side magnet clamp, the controller is configured to control the operation screen to display a pop-up window, the pop-up window including a description of an error type and a method for handling the error type, the error type being a type of the error.

10. An operation screen of a magnet clamp displayed on a controller of an injection molding machine including an injection device,
    wherein a mold clamping device of the injection molding machine is provided with the magnet clamp, the controller being configured to integrally control the mold clamping device, the injection device, and the magnet clamp,
    wherein injection molding machine is provided with an interlock to prevent the magnet clamp from being operated during operation of the injection molding machine and to prevent the injection molding machine from being operated during operation of the magnet clamp, mutually,
    wherein the operation screen is for controlling the magnet clamp to perform clamping or unclamping of a mold, and
    wherein the operation screen includes three columns comprising:
    an interlock column displaying the mutual interlock state between the magnet clamp and the injection molding machine;
    a monitor column displaying contents of signals communicated between the controller and the magnet clamp during the clamping or unclamping; and
    a manual operation column including a release button for unclamping the mold and a clamp button for clamping the mold.

* * * * *